Figure 1:
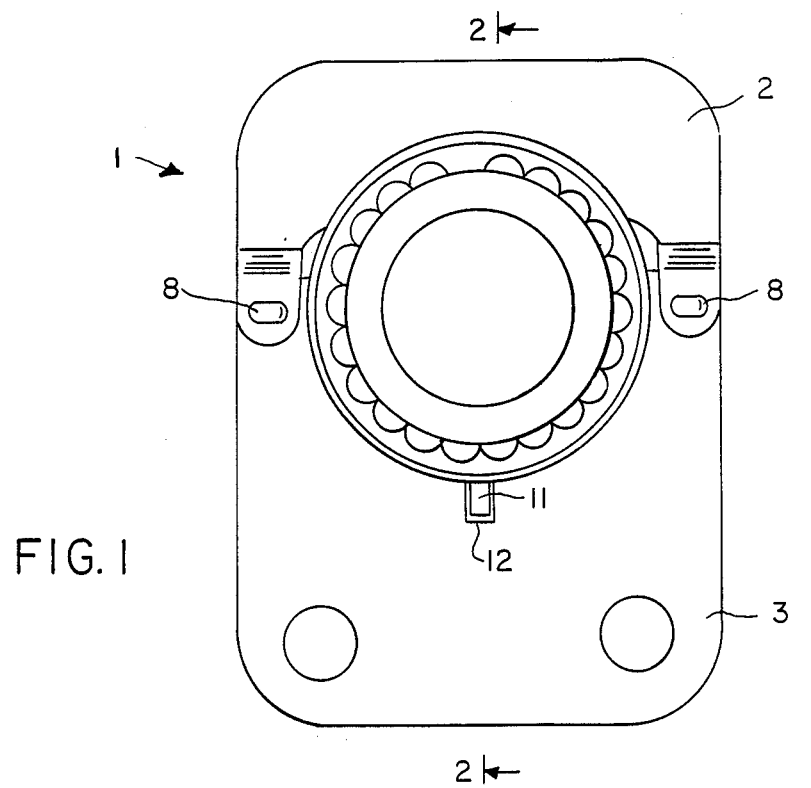

United States Patent [19]

Siebert et al.

[11] Patent Number: 4,729,674
[45] Date of Patent: Mar. 8, 1988

[54] BALL BEARING ASSEMBLY

[75] Inventors: Craig Siebert, Briarcliff Manor, N.Y.; Martin Scott, Brewster, Mass.

[73] Assignee: Metallized Carbon Corporation, Ossining, N.Y.

[21] Appl. No.: 848,764

[22] Filed: Apr. 7, 1986

[51] Int. Cl.⁴ .................... F16C 33/60; F16C 35/067; F16C 43/04

[52] U.S. Cl. .................. 384/505; 384/434; 384/504; 384/537; 384/906

[58] Field of Search .............. 384/432, 434, 435, 478, 384/490, 495, 499, 501, 504, 505, 512, 513, 537, 906

[56] References Cited

U.S. PATENT DOCUMENTS

| | | | |
|---|---|---|---|
| Re. 15,233 | 11/1921 | Sellen | 384/504 |
| 751,715 | 2/1904 | Butler | 384/505 |
| 1,255,661 | 2/1918 | Stewart | 384/537 |
| 1,262,681 | 4/1918 | Lavcock | 384/504 |
| 1,325,910 | 12/1919 | Reynolds | 384/504 |
| 1,863,142 | 6/1932 | Sisson | 384/434 |
| 3,801,171 | 4/1974 | Rozentals | 384/505 X |
| 4,425,009 | 1/1984 | Fillon et al. | 384/504 X |
| 4,569,602 | 2/1986 | Lundgren | 384/499 |

FOREIGN PATENT DOCUMENTS 17897 8/1909 United Kingdom ............... 384/435

Primary Examiner—Stuart S. Levy
Assistant Examiner—Thomas R. Hannon
Attorney, Agent, or Firm—Jordan B. Bierman

[57] ABSTRACT

A bearing composed of an inner race, two outer races concentric therewith and spaced axially from each other to leave a gap between them. Sets of ball bearings are located between the inner race and each of the two outer races. The outer races are provided with shoulders projecting axially toward one another and the whole is secured by a band wrapped circumferentially around the shoulders. Preferably, the band is thinner than the outer races so that part of the gap remains. The band is somewhat longer than the circumference and the ends are turned radially outwardly and fastened together.

In a particularly improved form of the device, frames are located in the gap and are releasably fastened to one another. The width of the gap is larger than the thickness of the frames, so that there is a certain amount of play in the bearing. This provides a self-aligning feature.

9 Claims, 2 Drawing Figures

BALL BEARING ASSEMBLY

The present invention is directed to an improved bearing, more specifically a bearing which is easily changed, and possesses various advantages in both manufacture and use.

The present invention is specifically intended for use in connection with certain forms of drying ovens, although it will find numerous other uses in other areas as well. Drying ovens, of the type under consideration, usually have high temperature and low temperature sections, and the articles to be dried (such as plywood) are passed through the ovens on rollers. Each of these rollers is journalled in a bearing which must withstand both the usual pressures and the extreme temperatures. Since these ovens are quite long, they contain a substantial number of transverse rollers and shafts therefor. Hence, there is a large number of bearings in each oven.

Clearly, it is important to be able to change these bearings rapidly, as the oven is totally unproductive during the replacement period. Hence, there is a strong need for bearings which not only will carry the load and withstand the temperatures, but also which can be removed and replaced quickly and easily.

Because of the size of these ovens, there is no assurance that the numerous transverse rollers and their shafts will be precisely parallel. As a matter of fact, it is common to find that many of these shafts are somewhat out of line with one another. Therefore, it is also desirable to provide a bearing which will take into account these variations and perform satisfactorily under such conditions.

Moreover, the environment in which the bearings operate is usually relatively dirty. Particles of foreign material can easily find their way into the bearings. Obviously, the presence of such dirt tends to cause the bearings to jam and/or wear excessively. It is therefore important to provide some means for minimizing this difficulty.

The foregoing problems are solved by the use of the present invention. A bearing of particular structure has been designed which will fulfill the foregoing requirement.

In practicing the present invention, there is provided an inner race, a first outer race, and a second outer race. The outer races are concentric with the inner race and surrounded generally in the usual manner. The outer races are axially spaced from one another leaving a gap therebetween.

The first set of ball bearings is located between the inner race and the first outer race, and the second set of ball bearings is between the inner race and the second outer race.

Shoulders are provided on the outer races which project axially toward one another. They constitute ledges which are substantially concentric with the inner race and preferably extend around the entire circumference of the outer races. A band is wrapped around the outer races and rests on the two shoulders. Preferably, the band is somewhat thinner than the outer races, so that the gap between them is only partially filled thereby.

Preferably, the band is longer than the circumference of the shoulder, so that there are extra lengths on the ends therof. when the band is wrapped around the bearing, these ends are affixed to one another, thereby securing the whole. This can be carried out by a simple spot welding of the ends of the band.

In order to facilitate the elimination of grit and dirt from the bearing, the outer races are provided with circumferential openings between the outer races and the inner race. It has been found that an angle of approximately 25° between a line parallel to the axis of the bearing and the open faces of the outer races is particularly suitable. In addition, a space is provided between the outer surface of the inner race and the inner surfaces of the band and the outer races. These openings and spaces permit any foreign matter which has found its way into the races of the bearing to fall out as a result of natural rotation.

In a modification of the present invention, supporting frames are provided for the bearing. When in use, such bearings must be affixed to the oven in order that they perform their function. As previously indicated, it is of great importance to be able to remove the bearings and replace them as quickly as possible.

In order to faciliate this, an upper frame and a lower frame are provided. They are essentially relatively thin flat pieces of metal, usually substantially rectangular in shape. Openings are provided thereon for fastening the bearing to the oven.

In the present invention, the frames are in two parts, an upper frame and a lower frame. One of the frames has a forked section at the edge nearest the other frame. This forked section surrounds the corresponding section of the other frame and there are holes completely therethrough. Preferably there are two such sections, one on either side of the bearing, and two sets of holes. The frames are releasably secured to one another by means of cotter pins passing through the holes.

Thus, when removal and replacement is appropriate, the cotter pins can be removed by the use of a simple pair of pliers. Since only one of the frames is secured to the oven, the other can easily be removed completely and the bearing assembly replaced.

In this form of the device, it is advantageous to bend the extra length of the band into a radially upstanding position and to affix the two lengths to one another. This provides a key which will fit into a complementary slot on one of the frames. This combination acts to prevent the bearing from rotating in the frames. The construction is very simple, since the band, having previously had the extra lengths bent outwardly, need only be wrapped around the outer races and the extra lengths spot welded to each other.

In a preferred form of the device, the radial thickness of the band is less than the depth of the gap between the two outer races. As a result, after the band has been installed, there remains a portion of the gap. Advantageously, the upper and lower frames will fit into this part of the gap, thereby securing them firmly—and easily releasably—to the bearing. In a particularly preferred form of the device, the width of the gap is larger than the thickness of the frames. This permits movement of the bearing relative to the frames so that misalignment of the shafts can be accommodated.

Figure 2:
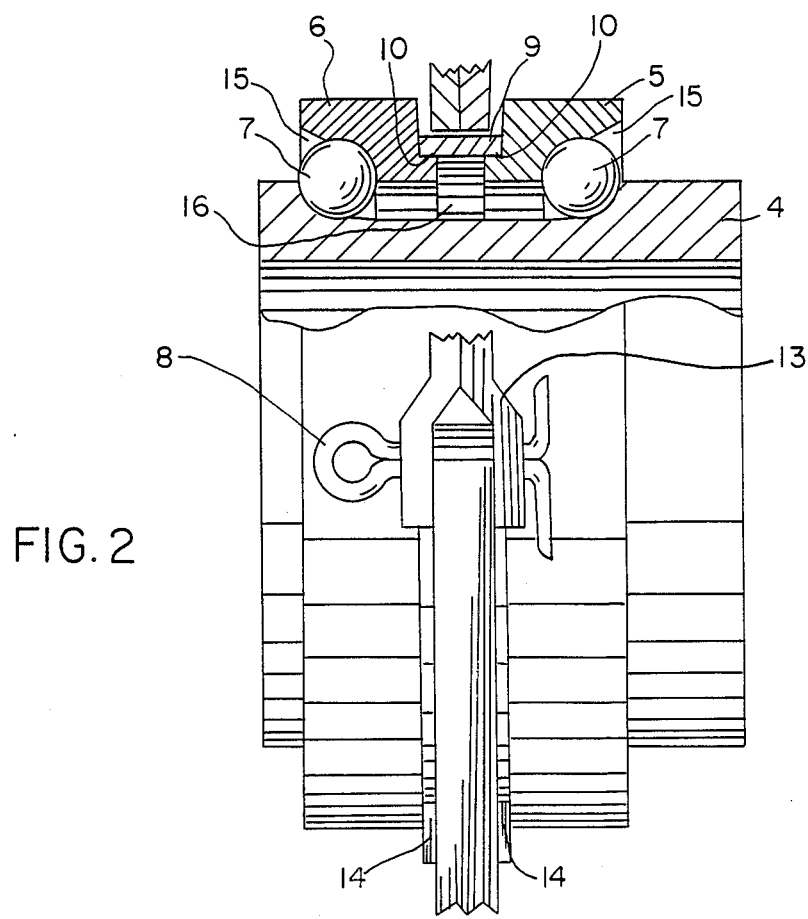

In the accompanying drawings, constituting a part hereof, and in which like reference characters indicate like parts, FIG. 1 is an elevation of the new bearing; and FIG. 2 is a view, partly in section, along lines 2—2 of FIG. 1.

Bearing 1 comprises inner race 4, first outer race 5, and second outer race 6. Sets of ball bearings 7 are located between inner race 4 and outer races 5 and 6.

The bearing assembly is provided with upper frame 2 and lower frame 3. Upper frame 2 has fork 13 which embraces the corresponding section of lower frame 3. Cotter pin 8 passes therethrough, locking frames 2 and 3 together.

Outer races 5 and 6 are mounted on inner race 4 as shown in FIG. 2. Shoulders 10 are located on outer races 5 and 6 and band 9 is wrapped therearound. The extra lengths of band 9 are bent radially outwardly and spot welded together to form key 11 which fits into slot 12 in lower frame 3. This prevents rotation of the bearing assembly relative to frames 2 and 3.

The thickness of frames 2 and 3 is less than the width of gap 14, thereby leaving room between the frames and the ends of the gap. This permits movement of the axis of the bearing to adjust for any mis-alignment.

Openings 15 are provided between outer races 5 and 6 and inner race 4. Also, spaces 16 are provided between band 9 and inner race 4, as well as between outer races 5 and 6 and inner race 4. These spaces permit foreign matter to fall out of the bearing assembly.

While only a limited number of embodiments of the present invention have been specifically described, such variatios as would be apparent to the person of ordinary skill in the art may be made without departing from the scope or spirt thereof. For example, the ends of the band may be affixed in a manner other than the specific one described. The key and slot may be either omitted or located at a different point from that specifically set forth. Other releasable fastening means may be substituted for the cotter pins shown herein.

The present invention is to be broadly construed and not to be limited except by the character of the claims appended hereto.

What we claim is:

1. A bearing comprising an inner race, a first outer race, and a second outer race, said outer races being concentric with said inner race, surrounding said inner race, and spaced axially from each other to leave a gap therebetween, a first set of ball bearings between said inner race and said first outer race, a second set of ball bearings between said inner race and said second outer race, shoulders on said outer races projecting axially toward each other, a band on said shoulders in said gap, said shoulders having a circumference, said band being longer than said circumference, thereby providing extra lengths on ends of said band, said extra lengths affixed to each other to retain said inner race, said outer races, and said sets of ball bearings in position.

2. The bearing of claim 1 further comprises an upper frame and a lower frame releasably secured to one another wherein said extra lengths extend radially outwardly to form a key, a slot in one of said frames complementary to said key, said key in said slot, whereby rotation of said outer races relative to said frames is prevented.

3. The bearing of claim 2 wherein said slot is in said lower frame.

4. A bearing comprising an inner race, a first outer race, and a second outer race, said outer races being concentric with said inner race, surrounding said inner race, and spaced axially from each other to leave a gap therebetween, a first set of ball bearings between said inner race and said first outer race, a second set of ball bearings between said inner race and said second outer race, shoulders on said outer races projecting axially toward each other, a band on said shoulders in said gap, said band being radially thinner than said outer races whereby said gap is not completely filled by said band, an upper frame and a lower frame, said frames being releasably secured to one another and located in said gap, one of said frames having a split fork section adapted to fit over a corresponding section of the other of said frames, at least one hole through said fork section and said corresponding section, and a cotter pin in said hole.

5. The bearing of claim 4 wherein said shoulders have a circumference and said band is longer than said circumference, thereby providing extra lengths on ends of said band, said extra lengths extending radially outwardly and being fixed to each other to form a key, a slot in one of said frames complementary to said key, said key in said slot, whereby rotation of said outer races relative to said frames is prevented, at least one of said outer races having a circumferential opening between the outer race and the inner race, a space between a radially inner side of said band and an external surface of said inner race, and said gap is axially larger than a thickness of said frames in said gap.

6. The bearing of claim 4 wherein at least one of said outer races has a circumferential opening between the outer race and the inner race.

7. The bearing of claim 4 wherein there is a space between a radially inner side of said band and an external surface of said inner race.

8. The bearing of claim 4 wherein there is a space between an external surface of said inner race and a radially inner surface of said outer race.

9. The bearing of claim 4 wherein said gap is axially larger than a thickness of said frames.

* * * * *